United States Patent
Shin

(10) Patent No.: US 10,249,062 B2
(45) Date of Patent: Apr. 2, 2019

(54) SYSTEM AND METHOD FOR IMAGE VIEW BINDING OPTIMIZATION

(71) Applicants: LINE Up Corporation, Seongnam-si, Gyeonggi-do (KR); LINE Studio Corporation, Seongnam-si, Gyeonggi-do (KR)

(72) Inventor: Seungyong Shin, Seongnam-si (KR)

(73) Assignees: LINE Up Corporation, Seongnam-si (KR); LINE Studio Corporation, Seongnam-si (KR)

( * ) Notice: Subject to any disclaimer, the term of this patent is extended or adjusted under 35 U.S.C. 154(b) by 85 days.

(21) Appl. No.: 15/077,066

(22) Filed: Mar. 22, 2016

(65) Prior Publication Data

US 2016/0350943 A1    Dec. 1, 2016

(30) Foreign Application Priority Data

May 29, 2015 (KR) .......................... 10-2015-0076045

(51) Int. Cl.
*G06T 11/00* (2006.01)
*A63F 13/50* (2014.01)

(52) U.S. Cl.
CPC ............ *G06T 11/001* (2013.01); *A63F 13/50* (2014.09)

(58) Field of Classification Search
CPC ............................. G06T 11/001; A63F 13/50
See application file for complete search history.

(56) References Cited

U.S. PATENT DOCUMENTS

| | | | |
|---|---|---|---|
| 2004/0151372 A1* | 8/2004 | Reshetov | G06T 9/005 382/166 |
| 2006/0092168 A1* | 5/2006 | Wetzel | G09G 3/003 345/582 |
| 2009/0147020 A1* | 6/2009 | Sellers | H04N 9/642 345/603 |
| 2013/0260893 A1 | 10/2013 | Shin et al. | |
| 2013/0332543 A1 | 12/2013 | Shin et al. | |
| 2014/0019540 A1 | 1/2014 | Shin et al. | |

FOREIGN PATENT DOCUMENTS

| | | |
|---|---|---|
| KR | 10-2010-0035623 | 4/2010 |
| WO | WO-2015/065001 A1 | 5/2015 |

OTHER PUBLICATIONS

Office Action dated Jun. 16, 2016 in Korean Patent Application No. 10-2015-0076045.
Korean Office Action dated Feb. 20, 2017 in Korean Application No. 10-2017-0010964.

* cited by examiner

*Primary Examiner* — Samantha (Yuehan) Wang
(74) *Attorney, Agent, or Firm* — Harness, Dickey & Pierce, P.L.C.

(57) ABSTRACT

An image rendering method includes: loading, at an electronic device, an image by an application executed on the electronic device; loading, at the electronic device, reference color arrangement information; and determining, at the electronic device, a pixel format for a texture creation of the loaded image based on a comparison between a color value of the loaded image and the loaded reference color arrangement information.

21 Claims, 6 Drawing Sheets

SYSTEM AND METHOD FOR IMAGE VIEW BINDING OPTIMIZATION

CROSS-REFERENCE TO RELATED APPLICATION(S)

This application claims priority under 35 U.S.C. § 119 to Korean Patent Application No. 10-2015-0076045 filed May 29, 2015, in the Korean Intellectual Property Office (KIPO), the entire contents of which are incorporated herein by reference.

BACKGROUND

Field

One or more example embodiments relate to technology for improving an image view binding, and more particularly, to systems and/or methods for loading and/or rendering file images.

Description of Related Art

In the related art, a mobile game and the like creates a texture based on a designated and fixed pixel format by loading a file image of an image. As an example of a pixel format, Android mobile operating system (OS) uses a pixel format of a file image for a setting configuration file of a bitmap.

The pixel format used in Android mobile OS includes, for example, ALPHA8, RGBA565, RGBA4444, RGBA8888, and the like. Here, in "RGBA", R denotes red, G denotes green, B denotes blue, and A denotes transparency alpha. For example, RGB565 refers to a technique of representing a single pixel using 2 bytes, and representing 16 bits (2 bytes) using R (5 bits), G (6 bits), and B (5 bits). Since $2^5$ is 32, red and blue have 32 precisions for classification, and thus, have a relatively low power of color expression and a reduced capacity. As another example, RGBA8888 refers to a technique of representing a single pixel using 4 bytes and has a relatively high power of color expression. For example, this technique may express 16,777,216 (=256*256*256) colors. A single byte is used for each color (RGBA).

As described above, in the related art, a texture is created based on a fixed pixel format designated for a loaded image.

SUMMARY

One or more example embodiments provide a system and method for converting a texture of a loaded image to an improved and/or optimized pixel format when loading and/ or rendering a file image.

According to at least one example embodiment, an image rendering method comprises: loading, at an electronic device, an image by an application executed on the electronic device; loading, at the electronic device, reference color arrangement information; and determining, at the electronic device, a pixel format for a texture creation of the loaded image based on a comparison between a color value of the loaded image and the loaded reference color arrangement information.

According to at least some example embodiments, the method may further include rendering the loaded image based on the determined pixel format for the texture creation.

According to at least some example embodiments, the method may further include: at least one of downloading and creating the reference color arrangement information; and storing the reference color arrangement information in a memory at the electronic device.

The reference color arrangement information may include a color arrangement image corresponding to a number of bits of a reference pixel format; and the determining the pixel format may include determining the pixel format for the texture creation based on a comparison between a color distribution of a color value of the color arrangement image and a color distribution of the color value of the loaded image.

According to at least some example embodiments, the determining the pixel format may further include: creating a m-dimensional color distribution chart including a first m-component color value for each pixel of the color arrangement image, axes of the m-dimensional color distribution chart corresponding to respective ones of m color components; applying a second m-component color value for each pixel of the loaded image to the m-dimensional color distribution chart; calculating a difference between the second m-component color value and the m-dimensional color distribution chart with respect to pixels outside the m-dimensional color distribution chart; and determining the pixel format for the texture creation of the loaded image based on the calculated difference; wherein m is greater than or equal to 3.

The m color components may include red, green and blue (RGB).

According to at least some example embodiments, the determining the pixel format for the texture creation of the loaded image based on the calculated difference may include: determining the pixel format for the texture creation of the loaded image as a first pixel format of a first number of bits, which is greater than the number of bits of the reference pixel format, if a standard deviation of the calculated difference is greater than or equal to a threshold value; and determining the pixel format for the texture creation of the loaded image as a second pixel format of a second number of bits, which is less than or equal to the number of bits of the reference pixel format, if the standard deviation is less than the threshold value.

According to at least some example embodiments, the calculating may include: calculating the difference based on a distance between a point represented by the second m-component color value on the m-dimensional color distribution chart and a point closest to the second m-component color value from among points represented by the first m-component color values on the m-dimensional color distribution chart.

According to at least some example embodiments, the method may further include: storing identification information about the loaded image in association with the determined pixel format; and in response to reloading the loaded image, using the pixel format stored in association with the identification information of the loaded image as the pixel format of the reloaded image.

According to at least some example embodiments, the method may further include: providing a game service using the loaded image; and rendering the loaded image based on the determined pixel format through a game engine at the electronic device.

At least one other example embodiment provides a non-transitory computer-readable medium storing computer executable instructions that, when executed by processing circuitry, cause the processing circuitry to perform an image rendering method comprising loading, at an electronic device, an image by an application executed on the electronic device; loading, at the electronic device, reference color arrangement information; and determining, at the electronic device, a pixel format for a texture creation of the loaded image based on a comparison between a color value of the loaded image and the loaded reference color arrangement information.

At least one other example embodiment provides an electronic device comprising a memory and processing circuitry. The memory is configured to store computer-executable instructions. The processing circuitry is configured to execute the computer-executable instructions to: load an image; load reference color arrangement information; and determine a pixel format for a texture creation of the loaded image based on a comparison between a color value of the loaded image and the loaded reference color arrangement information.

The processing circuitry may be further configured to execute the computer-executable instructions to render the image based on the determined pixel format.

The processing circuitry may be further configured to execute the computer-executable instructions to: at least one of download and create the reference color arrangement information; and store the reference color arrangement information in the memory.

The reference color arrangement information may include a color arrangement image corresponding to a number of bits of a reference pixel format. The processing circuitry may be further configured to execute the computer-executable instructions to determine the pixel format for the texture creation of the loaded image based on a comparison between a color distribution of a color value of the color arrangement image and a color distribution of the color value of the loaded image.

The processing circuitry may be further configured to execute the computer-executable instructions to: create a m-dimensional color distribution chart of a first m-component color value for each pixel of the color arrangement image, axes of the m-dimensional color distribution chart corresponding to respective ones of m color components; apply a second m-component color value for each pixel of the loaded image to the m-dimensional color distribution chart; calculate a difference between the second m-component color value and the m-dimensional color distribution chart with respect to pixels outside the m-dimensional color distribution chart; and determine the pixel format for the texture creation of the loaded image based on the calculated difference; wherein m is greater than or equal to 3.

The m color components may include red, green, and blue (RGB).

The processing circuitry may be further configured to execute the computer-executable instructions to: determine the pixel format for the texture creation of the loaded image as a first pixel format of a first number of bits, which is greater than the number of bits of the reference pixel format, if a standard deviation of the calculated difference is greater than or equal to a threshold value; and determine the pixel format for the texture creation of the loaded image as a second pixel format of a second number of bits, which is less than or equal to the number of bits of the reference pixel format, if the standard deviation is less than the threshold value.

The processing circuitry may be further configured to execute the computer-executable instructions to calculate the difference based on a distance between a point represented by the second m-component color value on the m-dimensional color distribution chart and a point closest to the second m-component color value from among points represented by the first m-component color values on the m-dimensional color distribution chart.

The memory may be further configured to store identification information about the loaded image in association with the determined pixel format. The processing circuitry may be further configured to execute the computer-executable instructions to use the pixel format stored in association with the identification information of the loaded image as the pixel format when reloading the loaded image.

The processing circuitry may be further configured to execute the computer-executable instructions to: provide a game service using the loaded image; and render the loaded image based on the determined pixel format.

According to at least one example embodiment, in response to loading and rendering a file image, a texture of a loaded image may be converted to an improved and/or optimized pixel format.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
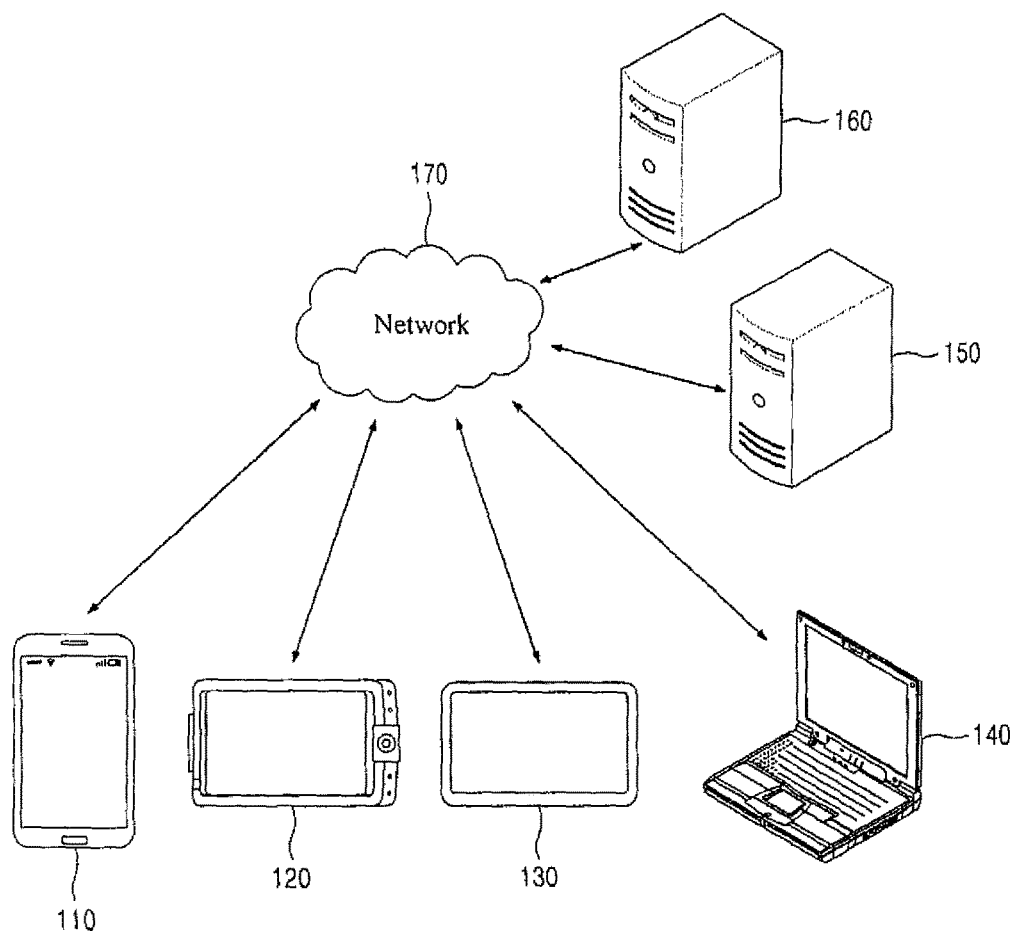
FIG. 1 illustrates an example of an operation environment of a system for rendering an image according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

At least one example embodiment will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices (e.g., an image loader, reference color arrangement information loader, pixel format determiner, etc.) according to at least one example embodiment may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to at least one example embodiment, computer processing devices may be described as including various functional units that perform various operations and/or functions to increase the clarity of the description. However, computer processing devices are not intended to be limited to these functional units. For example, in at least one example embodiment, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to at least one example embodiment may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of an operation environment of a system for rendering an image according to at least one example embodiment.

Referring to FIG. 1, the operation environment of the system includes electronic devices 110, 120, 130, and 140, servers 150 and 160, and a network 170.

The electronic devices 110, 120, 130, and 140 are examples of apparatuses for processing and/or rendering of images. Although FIG. 1 illustrates four electronic devices 110, 120, 130, and 140, it is only an example for describing the operation environment, and example embodiments are not limited thereto. Each of the electronic devices 110, 120, 130, and 140 may be a fixed terminal or a mobile terminal. For example, the electronic devices 110, 120, 130, and/or 140 may be smartphones, mobile phones, navigation devices, computers, laptop computers, digital broadcasting terminals, personal digital assistants (PDAs), portable multimedia players (PMPs), a tablet personal computers (PCs), and the like. Each of the electronic devices 110, 120, 130, and 140 may communicate with another electronic device and/or the servers 150 and/or 160 over the network 170 over a wired and/or wireless connection. Although an apparatus not requiring a separate communication function may process rendering using an image from a storage included in the apparatus according to example embodiments, an example of receiving an image to be rendered through communication with the servers 150 and/or 160 will be described in connection with example embodiments.

Communication methods described herein are not particularly limited and may include communication methods that use near field wireless communication between devices as well as a communication network, for example, a mobile communication network, the wired Internet, the wireless Internet, and/or a broadcasting network, which may be included in the network 170.

The network 170 may include, for example, at least one of a personal area network (PAN), a local area network (LAN), a campus area network (CAN), a metropolitan area network (MAN), a wide area network (WAN), a broadband network (BBN), the Internet, and the like. Also, the network 170 may include at least one network topology including a bus network, a star network, a ring network, a mesh network, a star-bus network, a tree or hierarchical network, and the like. However, these are only examples, and example embodiments are not limited thereto.

Each of the servers 150 and 160 may be configured as an apparatus or a plurality of apparatuses that provide(s) services and/or content through communication with the electronic devices 110, 120, 130, and/or 140 over the network 170. The servers 150 and 160 may be constructed to constitute a single system for providing services and/or content to the electronic devices 110, 120, 130, and/or 140, or may be individual systems that provide different services and/or content. For example, the server 150 may be a system that provides a game service to the electronic devices 110, 120, 130, and/or 140, and the server 160 may be a file distribution system that distributes an installation file of an application for the game service provided from the server 150. Although FIG. 1 illustrates two servers 150 and 160, it is only an example to describe the operation environment, and example embodiments are not limited thereto.

The servers 150 and/or 160 may provide services and/or content to the electronic devices 110, 120, 130, and/or 140 in response to a user request through the electronic devices 110, 120, 130, and/or 140. For example, the electronic devices 110, 120, 130, and/or 140 may receive code, files, data, and the like, provided from the servers 150 and/or 160, and/or may receive the services and/or content provided from the servers 150 and/or 160 using a program installed at the electronic devices 110, 120, 130, and/or 140.

Hereinafter, various example embodiments will be described based on a single electronic device 110, such as, a smartphone.

Figure 2:
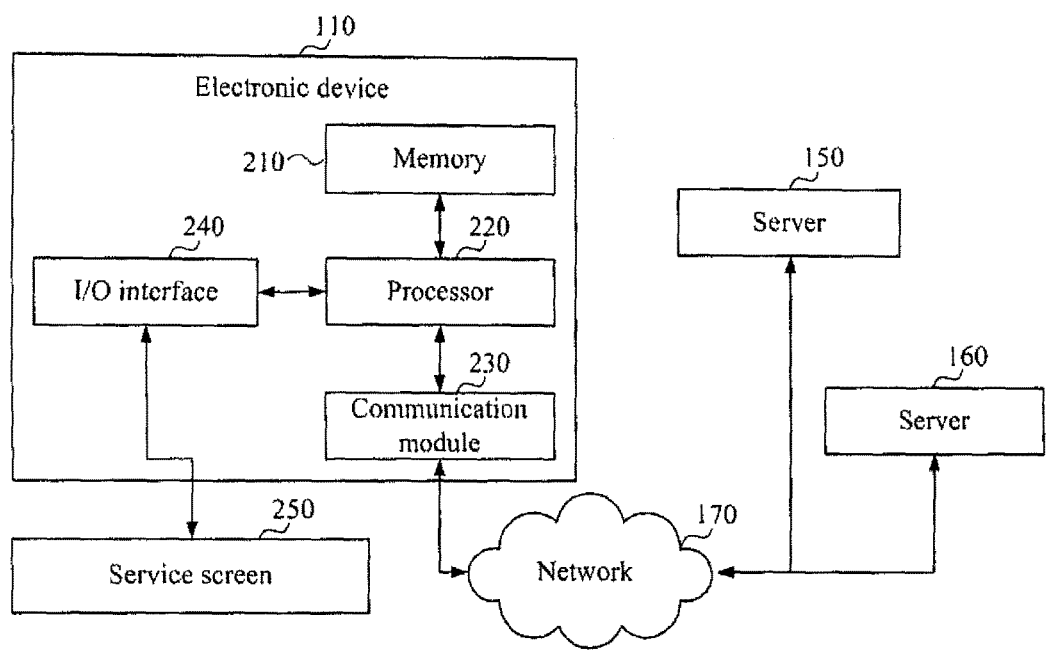
FIG. 2 is a block diagram illustrating a configuration of an electronic device according to at least one example embodiment.

FIG. 2 is a block diagram illustrating a configuration of an electronic device according to at least one example embodiment.

Referring to FIG. 2, the electronic device 110 includes a memory 210, a processor 220 (also referred to herein as processing circuitry), a communication module 230, and an input/output (I/O) interface 240. The memory 210 may include a permanent mass storage device, such as random access memory (RAM), read only memory (ROM), a disk drive, etc., as a computer-readable storage medium. Also, an operating system (OS) and at least one program code, for example, computer-readable instructions, may be stored in the memory 210. For example, the at least one program code may include at least one code for processing rendering of an image. Such software constituent elements may be loaded from another computer-readable storage medium separate from the memory 210 using a drive mechanism. The other computer-readable storage medium may include, for example, a floppy drive, a disk, a tape, a DVD/CD-ROM drive, a memory card, etc. According to other example embodiments, software constituent elements may be loaded to the memory 210 through the communication module 230, instead of, or in addition to, the computer-readable storage medium. For example, at least one program code may be loaded to the memory 210 based on a program installed by files provided from developers over the network 170.

The processor 220 may be configured to process and/or execute computer-readable instructions, for example, the aforementioned at least one program code, of a computer program by performing basic arithmetic operations, logic operations, and/or I/O operations. The computer-readable instructions may be provided from the memory 210 and/or the communication module 230 to the processor 220.

The communication module 230 may provide functionality for communication with another device over the network 170. For example, a request message created at the processor 220 in response to user input may be transferred to the server 150 over the network 170 under control of the communication module 230. Inversely, data transmitted from the server 150 over the network 170 may be received at the electronic device 110 through the communication module 230.

According to at least some other example embodiments, the electronic device 110 may include a greater or lesser number of constituent elements than the number of constituent elements shown in FIG. 2. For example, the electronic device 110 may further include other constituent elements, such as a display (e.g., a touch screen display), a transceiver, a global positioning system (GPS) module, and the like.

The I/O interface 240 may provide functionality for connecting with an I/O device that is further included in the electronic device 110 or associated with the electronic device 110. For example, an input device may include a mouse, a keyboard, a touch panel, a microphone, and the like, and an output device may include a speaker, a display, a touch screen, and the like. For example, a service screen 250 may be configured through an image that is loaded to the memory 210 and rendered through the processor 220, and may be displayed on a touch screen of the electronic device 110.

Figure 3:
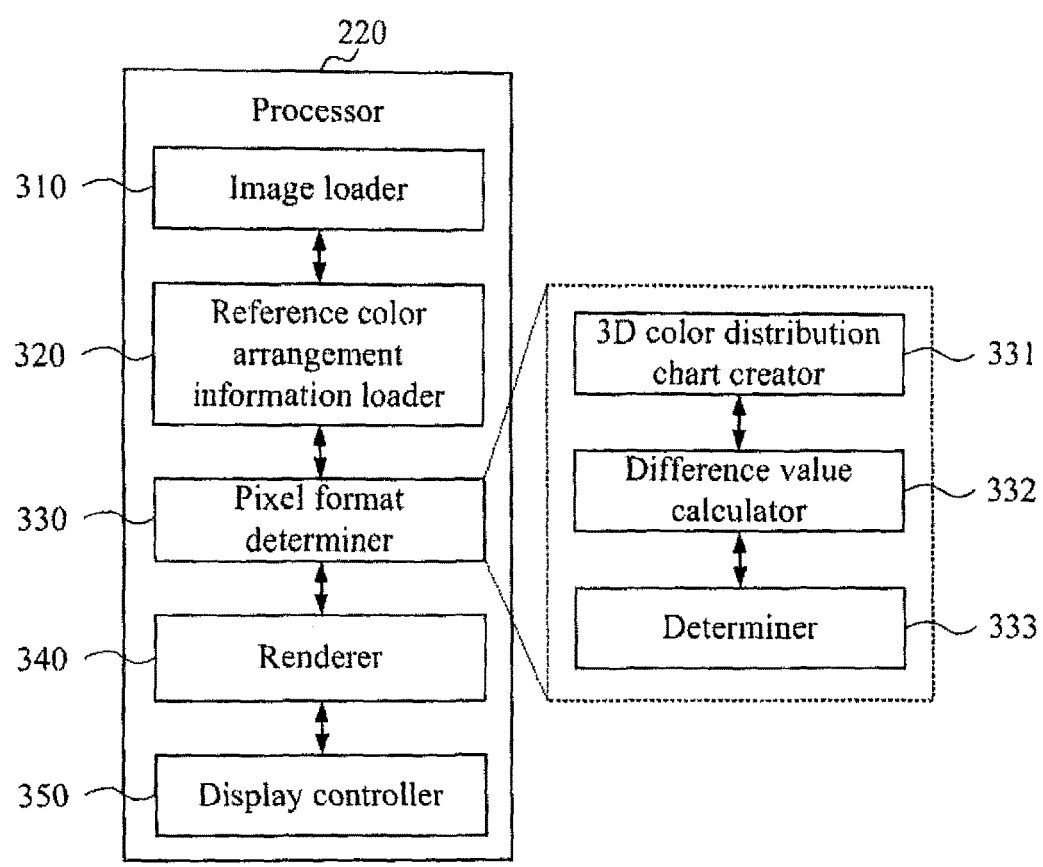
FIG. 3 is a block diagram illustrating a processor included in an electronic device according to at least one example embodiment.

FIG. 3 is a block diagram illustrating a processor included in an electronic device according to at least one example embodiment.

Figure 4:
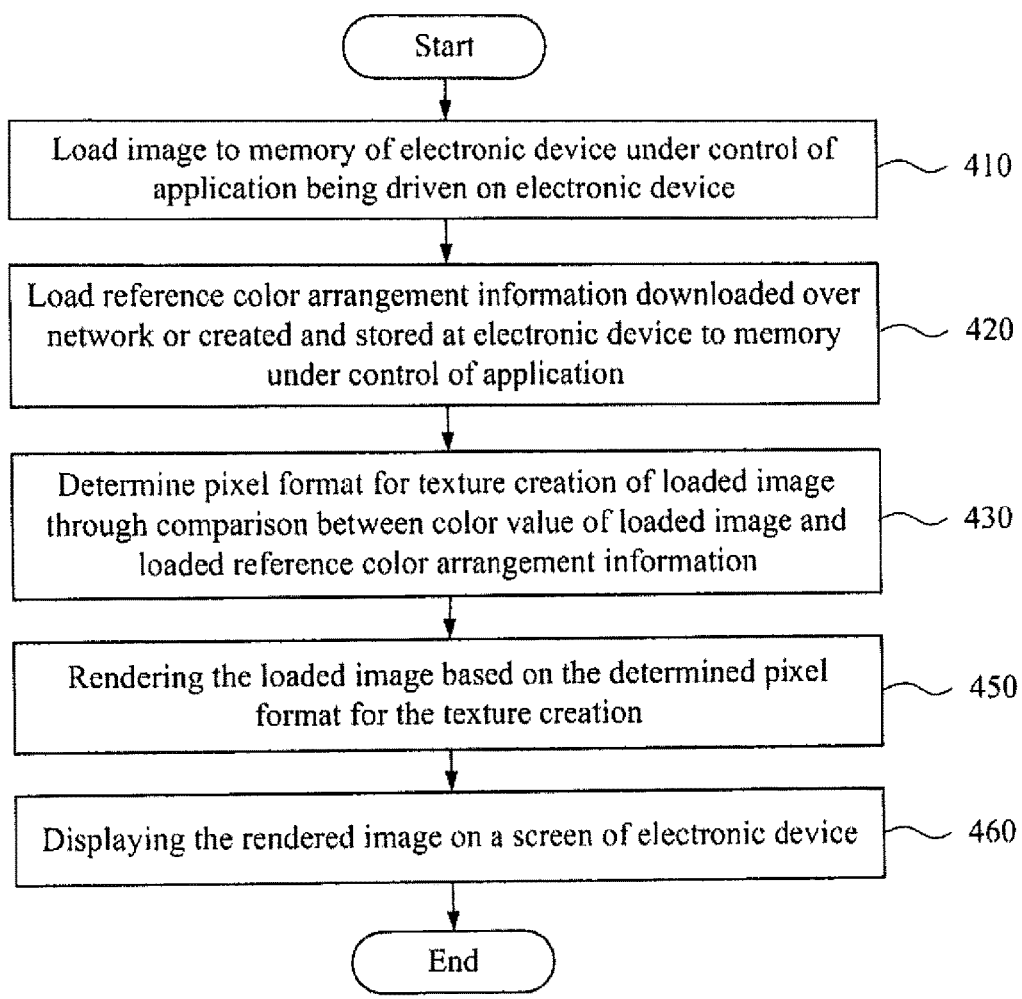
FIG. 4 is a flowchart illustrating a rendering method of an electronic device according to at least one example embodiment.

FIG. 4 is a flowchart illustrating a rendering method of an electronic device according to at least one example embodiment.

Referring to FIG. 3, the processor 220 included in the electronic device 110 includes an image loader 310, a reference color arrangement information loader 320, a pixel format determiner 330, a renderer 340, and a display controller 350. Such constituent elements may be configured to perform operations 410 through 460 of FIG. 4 through the OS and at least one program code included in the memory 210. The image loader 310, the reference color arrangement information loader 320, the pixel format determiner 330, the renderer 340, and the display controller 350 are different representations of functions of the processor 220. For example, the image loader 310 may be used to represent a function of processor 220 loading an image.

Referring to FIG. 4, in operation 410 the image loader 310 may load an image to the memory 210 of the electronic device 110 under control of an application being driven on the electronic device 110. For example, the image to be loaded may be an image provided for a service of the server(s) 150 and/or 160. As another example, the image to be loaded may be an image that is stored in a computer-readable storage medium of the electronic device 110.

In operation 420, the reference color arrangement information loader 320 may load reference color arrangement information downloaded over the network 170, or created and stored at the electronic device 110 to the memory 210 under control of the application. For example, the reference color arrangement information may be downloaded at a time of installing the application, may be downloaded from the server(s) 150 and/or 160 under control of the application installed at the electronic device 110, or may be created (e.g., directly created) at the electronic device 110 under control of the application and be stored in a storage, for example, the memory 210, of the electronic device 110 or a separate computer-readable storage medium. The reference color arrangement information may include information about a color arrangement corresponding to the number of bits of a reference pixel format.

In operation 430, the pixel format determiner 330 may determine a pixel format for a texture creation of the loaded image based on a comparison between a color value of the loaded image and the loaded reference color arrangement information. For example, the pixel format determiner 330 may determine the pixel format of the loaded image by comparing a color value in color arrangement of the reference color arrangement information and a color value of the loaded image. In this example, the electronic device 110 may render the loaded image by creating a texture of the loaded image based on the determined pixel format and may display the rendered image on a screen.

In more detail, for example, in the case of conventional image rendering, a pixel format of each image is classified in advance based on 16 bits, 32 bits, and the like, and in this state, binding thereof is performed. However, if an image sufficiently expressible using 16 bits is rendered based on 32 bits, resources of the memory 210 or the like may be wasted. According to example embodiments, the pixel format may be determined by analyzing a color value of an image, and comparing the color value to color arrangement corresponding to the reference pixel format, instead of using a pre-classified pixel format. That is, for example, view binding may be enabled by dynamically determining the pixel format of the loaded image.

In more detail, for example, the reference color arrangement information may include a color arrangement image corresponding to the number of bits of the reference pixel format. In this case, the pixel format determiner 330 may determine the pixel format for the texture creation of the loaded image through comparison between a color distribution of a color value of the color arrangement image and a color distribution of a color value of the loaded image in operation 430. When the color distribution of the color value of the loaded image deviates from the color distribution of the color value of the color arrangement image by at least a desired (or alternatively predetermined) reference (or threshold) value, a pixel format of the number of bits greater than the number of bits of the reference pixel format may be required. In this case, the pixel format determiner 330 may determine, as the pixel format of the loaded image, the pixel format of the number of bits, for example, 32 bits, greater than the number of bits, for example, 16 bits, of the reference pixel format.

It is assumed that the electronic device 110 includes Android OS, and uses a 16-bit color arrangement image as reference color arrangement information. When a color distribution of a color value of the loaded image deviates from a color distribution of a color value of the color arrangement image by at least a desired (or alternatively predetermined) reference (or threshold) value, the pixel format determiner 330 may determine a pixel format of the loaded image as 32 bits of RGBA8888. On the contrary, when the color distribution of the color value of the loaded image does not deviate from (e.g., is within) the color distribution of the color value of the color arrangement image by the desired (or alternatively predetermined) reference value, the pixel format determiner 330 may determine the pixel format of the loaded image as 16 bits of RGB565. According to at least some example embodiments, the same 16-bit images may have different pixel formats based on whether an alpha value indicating a transparency is present. For example, RGB565 may be applicable to an image in which the alpha value is absent and RGBA4444 may be applicable to an image in which the alpha value is present. A texture of the loaded image may be created based on the determined pixel format.

Unnecessary use of resources may be suppressed and/or prevented by loading an image, analyzing a color distribution at the time of rendering, and determining a pixel format of the loaded image, instead of using a current or pre-classified pixel format.

In operation 450, the renderer 340 may render the loaded image based on the determined pixel format for the texture creation. In the visual arts, texture is the perceived surface quality of a work of art. It is an element of two-dimensional and three-dimensional designs and is distinguished by its perceived visual and physical properties. Use of texture, along with other elements of design, can convey a variety of messages and emotions. The renderer 340 may create a texture for the loaded image using the determined pixel format.

In at least one example embodiment, an application to be installed in the electronic device 110 may include a game engine that provides a game service using the loaded image. In an example embodiment that provides a game service, the application may control the electronic device 110 to render the loaded image based on the determined pixel format through the game engine.

In operation 460, the display controller 350 may display the rendered image on a screen of the electronic device 110.

According to at least some example embodiments, referring again to FIG. 3, the pixel format determiner 330 includes a 3D color distribution chart creator 331, a difference value calculator 332, and a determiner 333.

Figure 5:
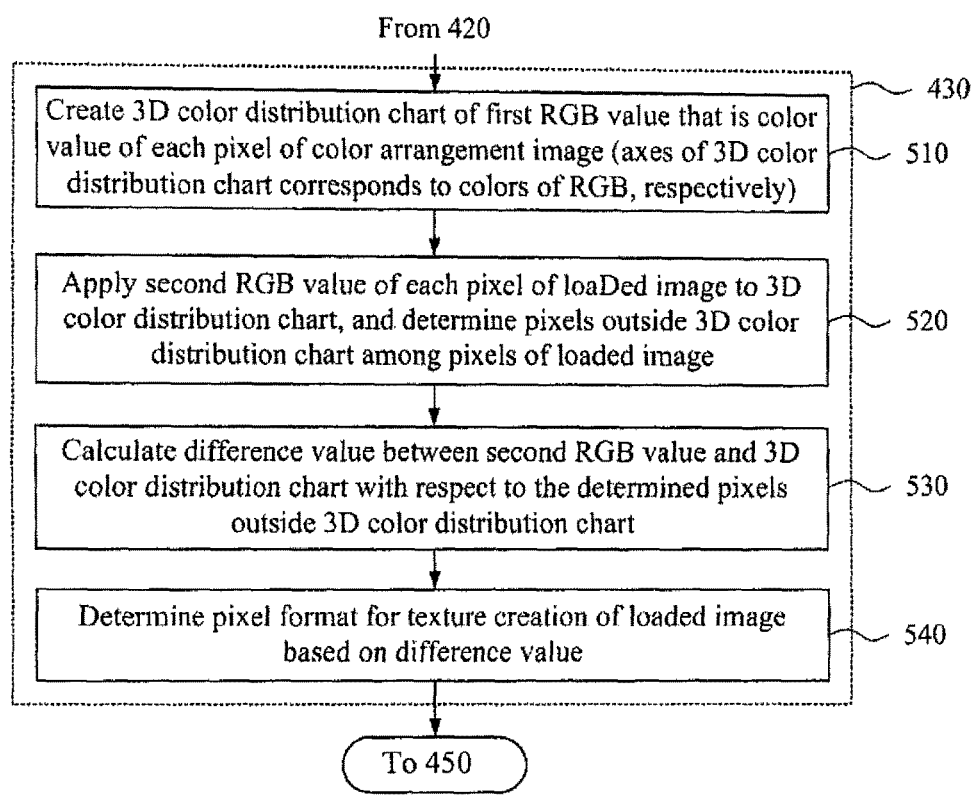
FIG. 5 is a flowchart illustrating a method for determining a pixel format according to at least one example embodiment.

FIG. 5 is a flowchart illustrating a method for determining a pixel format at operation 430 in FIG. 4, according to at least one example embodiment.

The 3D color distribution chart creator 331, the difference value calculator 332, and the determiner 333 in FIG. 3 may be configured to perform operations 510 through 540 shown in FIG. 5, through the OS and at least one program code included in the memory 210.

Referring to FIGS. 3 and 5, in operation 510, the 3D color distribution chart creator 331 may create a 3D color distribution chart (also referred to as a m-dimensional color distribution chart) of a first red, green, blue (RGB) value (also referred to herein as a first m-component color value, where m is greater than or equal to 3) that is a color value of each pixel of the color arrangement image. Here, axes of the 3D color distribution chart may correspond to colors of RGB, respectively. For example, in the 3D color distribution chart, an X axis may correspond to red, a Y axis may correspond to green, and a Z axis may correspond to blue. A color value of a single pixel may be represented as a single point on the 3D color distribution chart. The 3D color distribution chart may be created by displaying first RGB values that are color values of all of pixels of the color arrangement image on a 3D area. Although example embodiments are discussed herein with regard to the RGB color model, example embodiments should not be limited to this example. Rather, example embodiments may be utilized in conjunction with any suitable color model having any number of components including, for example, the cyan, magenta, and yellow (CMY) and the cyan, magenta, and yellow and black (CMYK) color models. Additionally, although discussed with regard to a 3D area, example embodiments should not be limited to this example. Rather, example embodiments may be applicable to m-dimensional areas, where m is again greater than or equal to 3.

In operation 520, the difference value calculator 332 may apply a second RGB value (also referred to herein as a second m-component color value, where m is greater than or equal to 3) of each pixel of the loaded image to the 3D color distribution chart, and may determine pixels outside the 3D color distribution chart among pixels of the loaded image. For example, the determined pixels may be pixels having color values outside a range of color values of pixels of the color arrangement image.

In operation 530, the difference value calculator 332 may calculate a difference value between the second RGB value and the 3D color distribution chart with respect to the determined pixels outside the 3D color distribution chart. For example, the difference value may be calculated based on a distance (or difference) between a point represented by the second RGB value on the 3D color distribution chart and a point closest thereto among points represented by the first RGB value on the 3D color distribution chart.

In operation 540, the determiner 333 may determine the pixel format for the texture creation of the loaded image based on the difference value. For example, in operation 540, the determiner 333 may determine the pixel format for the texture creation of the loaded image as a pixel format of the number of bits greater than the number of bits of the reference pixel format if a standard deviation of the calculated difference value is greater than or equal to a threshold (e.g., a preset) value, and may determine the pixel format for the texture creation of the loaded image as a pixel format of the number of bits less than or equal to the number of bits of the reference pixel format if the standard deviation is less than the threshold value. As the standard deviation becomes closer to zero, it may indicate that the number of colors deviating from the number of colors corresponding to the number of bits of the reference pixel format is relatively small. Thus, the determiner 333 may determine the pixel format for the loaded image based on a value of the standard deviation.

Although not illustrated, rendering methods according to at least some example embodiments may further include storing identification information (e.g., identifier of the loaded image) about the loaded image, of which the pixel format is determined, in a cache in association with the determined pixel format, in addition to the aforementioned operations, depending on example embodiments. This operation may be performed by a storage (not shown) further included in the processor 220. A cache may be configured on, for example, the memory 210. Here, in response to reloading the loaded image, a pixel format of the reloaded image may be determined as the pixel format stored in the cache in association with the identification information of the loaded image. That is, for example, once a pixel format of an image is determined, rendering of the image may be processed based on the pixel format stored in the cache in association with the image. Thus, a process of determining the pixel format may be skipped, that is, omitted and a process of creating a texture may be performed (e.g., immediately performed).

Figure 6:
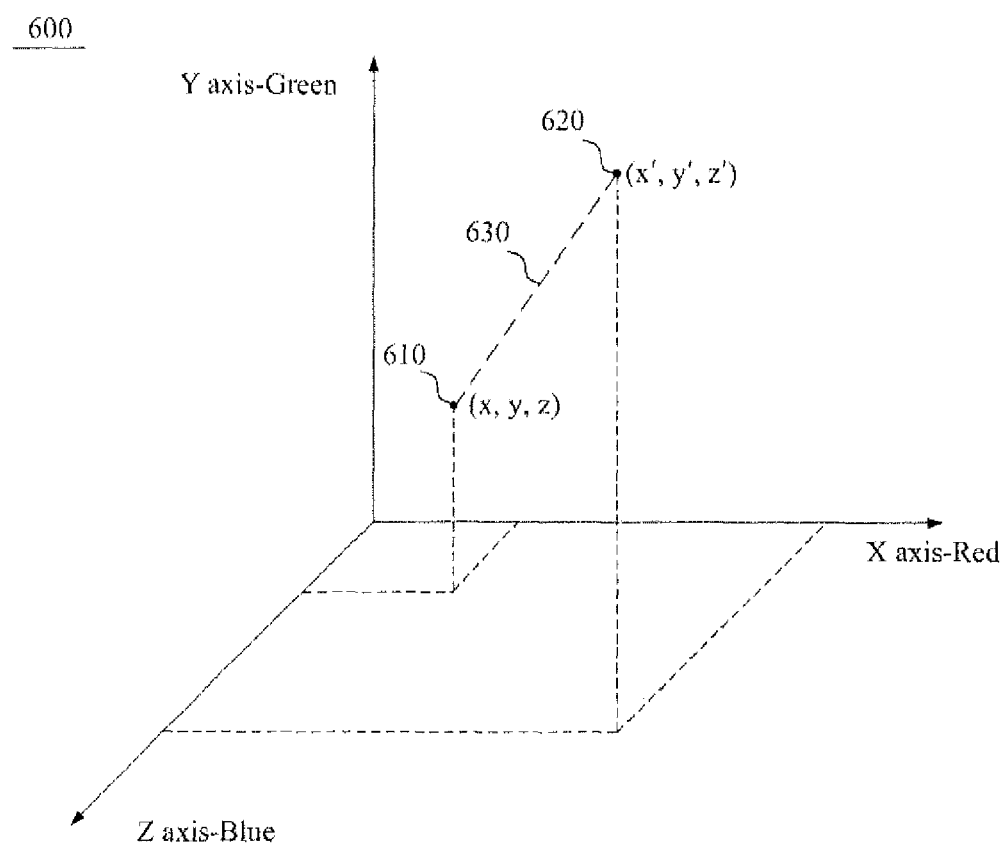
FIG. 6 is a graph showing an example of a three-dimensional (3D) space according to at least one example embodiment.

FIG. 6 is a graph showing an example of a 3D space according to at least one example embodiment.

Referring to FIG. 6, a 3D coordinate system 600 represents a coordinate system constructed such that an X axis corresponds to red, a Y axis corresponds to green, and a Z axis corresponds to blue.

In a color arrangement image based on a 16-bit pixel format, an RGB value that is a color value of a single first pixel may be represented as a single point 610 having coordinates (x, y, z) on the 3D coordinate system 600. Here, x, y, and z may correspond to an R value, a G value, and a B value of the first pixel, respectively.

In the case of representing RGB values of all pixels of the color arrangement image as points on the 3D coordinate system 600, the 3D color distribution chart that is a color distribution chart provided in a 3D form may be created.

When applying the loaded image to the 3D color distribution chart in which the loaded image is an image expressible using a 16-bit pixel format, many pixel values may be included in the 3D color distribution chart. Accordingly, if at least a threshold (or reference) number of color values are outside the range of the 3D color distribution chart, then the corresponding image may not be readily represented using 16 bits. In this case, the pixel format of the loaded image may be determined based on a pixel format of a larger number of bits, such as 32 bits.

For example, an RGB value that is a color value of a single second pixel of the loaded image may be represented as a single second point 620 having coordinates (x', y', z') on the 3D coordinate system 600.

Based on the assumption that the second point 620 is outside the range of the 3D color distribution chart and the first point 610 is closest to the second point 620 on the 3D color distribution chart, the difference value calculator 332 may calculate a value of a distance 630 between the first point 610 and the second point 620 as a difference value.

Here, a difference value may be calculated with respect to second pixels that deviate from (e.g., are outside) the range of the 3D color distribution chart among all of the second pixels of the loaded image. As described above, whether to render the loaded image based on a 16-bit pixel format or whether to render the loaded image based on a pixel format of the number of bits greater than 16 bits, such as 32 bits, through a standard distribution of difference values.

According to at least one example embodiment, in the case of loading and/or rendering a file image, a texture of the loaded image may be converted to an improved and/or optimized pixel format.

The devices and/or units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An image rendering method comprising:
    loading an image by an application executed on an electronic device;
    loading, at the electronic device, reference color arrangement information;
    determining, at the electronic device, a pixel format for a texture creation of the loaded image based on a comparison between at least one color value of the loaded image and the loaded reference color arrangement information; and
    rendering, at the electronic device, the loaded image based on the determined pixel format.

2. The method of claim 1, further comprising:
    performing at least one of,
        downloading the reference color arrangement information, and
        creating the reference color arrangement information; and
    storing the reference color arrangement information in a memory of the electronic device.

3. The method of claim 1, wherein
    the reference color arrangement information includes a color arrangement image corresponding to a number of bits of a reference pixel format; and
    the determining the pixel format includes
        determining the pixel format for the texture creation based on a comparison between a color distribution of at least one color value of the color arrangement image and a color distribution of the at least one color value of the loaded image.

4. The method of claim 3, wherein the determining the pixel format further comprises:
    creating a m-dimensional color distribution chart including a plurality of first m-component color values corresponding to each pixel of the color arrangement image, each axis of the m-dimensional color distribution chart corresponding to a respective m color component;
    applying a plurality of second m-component color values corresponding to each pixel of the loaded image to the m-dimensional color distribution chart;
    calculating at least one difference between the plurality of second m-component color values and the m-dimensional color distribution chart with respect to one or more pixels outside the m-dimensional color distribution chart; and
    determining the pixel format for the texture creation based on the at least one calculated difference,
    wherein m is greater than or equal to 3.

5. The method of claim 4, wherein the m color components include red, green and blue (RGB).

6. The method of claim 4, wherein the determining the pixel format for the texture creation of the loaded image based on the at least one calculated difference comprises:
    determining the pixel format for the texture creation as a first pixel format of a first number of bits, which is greater than the number of bits of the reference pixel format, if a standard deviation of the at least one calculated difference is greater than or equal to a threshold value; and
    determining the pixel format for the texture creation as a second pixel format of a second number of bits, which is less than or equal to the number of bits of the reference pixel format, if the standard deviation is less than the threshold value.

7. The method of claim 4, wherein the calculating comprises:
    calculating the at least one difference based on at least one distance between a point represented by the one or more pixels outside the m-dimensional color distribution chart and a point closest to the one or more pixels from among points represented by the plurality of first m-component color values on the m-dimensional color distribution chart.

8. The method of claim 1, further comprising:
    storing identification information about the loaded image in association with the determined pixel format; and
    using the pixel format stored in association with the identification information of the loaded image as the pixel format when reloading the loaded image.

9. The method of claim 1, further comprising:
    providing a game service using the loaded image,
    wherein the rendering renders the loaded image through a game engine at the electronic device.

10. A non-transitory computer-readable medium storing computer executable instructions that, when executed by at least one processor, cause the at least one processor to perform the method of claim 1.

11. The method of claim 1, wherein
    the reference color arrangement information includes a reference range of color values corresponding to a number of bits of a reference pixel format; and
    the determining the pixel format includes comparing a distribution of color values of a plurality of pixels of the loaded image to the reference range.

12. The method of claim 11, wherein the determining the pixel format further includes:
    determining one or more first pixels of the plurality of pixels of the loaded image located outside of the reference range; and
    determining a distance between each of the one or more first pixels and the reference range.

13. An electronic device comprising:
    a memory configured to store computer-executable instructions; and
    at least one processor configured to execute the computer-executable instructions to
        load an image, load reference color arrangement information, determine a pixel format for a texture creation based on a comparison between at least one color value of the loaded image and the loaded reference color arrangement information, and render the loaded image based on the determined pixel format.

14. The electronic device of claim 13, wherein the at least one processor is further configured to execute the computer-executable instructions to perform at least one of, download the reference color arrangement information, and create the reference color arrangement information; and store the reference color arrangement information in the memory.

15. The electronic device of claim 13, wherein the reference color arrangement information includes a color arrangement image corresponding to a number of bits of a reference pixel format; and the at least one processor is further configured to execute the computer-executable instructions to determine the pixel format for the texture creation based on a comparison between a color distribution of at least one color value of the color arrangement image and a color distribution of the at least one color value of the loaded image.

16. The electronic device of claim 15, wherein the at least one processor is further configured to execute the computer-executable instructions to create a m-dimensional color distribution chart including a plurality of first m-component color values corresponding to each pixel of the color arrangement image, each axis of the m-dimensional color distribution chart corresponding to a respective m color component;

apply a plurality of second m-component color values corresponding to each pixel of the loaded image to the m-dimensional color distribution chart;

calculate at least one difference between the plurality of second m-component color values and the m-dimensional color distribution chart with respect to one or more pixels outside the m-dimensional color distribution chart; and determine the pixel format for the texture creation based on the at least one calculated difference, wherein m is greater than or equal to 3.

17. The electronic device of claim 16, wherein the m color components include red, green and blue (RGB).

18. The electronic device of claim 16, wherein the at least one processor is further configured to execute the computer-executable instructions to determine the pixel format for the texture creation as a first pixel format of a first number of bits, which is greater than the number of bits of the reference pixel format, if a standard deviation of the at least one calculated difference is greater than or equal to a threshold value; and determine the pixel format for the texture creation as a second pixel format of a second number of bits, which is less than or equal to the number of bits of the reference pixel format, if the standard deviation is less than the threshold value.

19. The electronic device of claim 16, wherein the at least one processor is further configured to execute the computer-executable instructions to calculate the at least one difference based on at least one distance between a point represented by the one or more pixels outside the m-dimensional color distribution chart and a point closest to the one or more pixels from among points represented by the plurality of first m-component color values on the m-dimensional color distribution chart.

20. The electronic device of claim 13, wherein the memory is further configured to store identification information about the loaded image in association with the determined pixel format; and the at least one processor is further configured to execute the computer-executable instructions to use the pixel format stored in association with the identification information of the loaded image as the pixel format when reloading the loaded image.

21. The electronic device of claim 13, wherein the at least one processor is further configured to execute the computer-executable instructions to provide a game service using the loaded image; and render the loaded image through a game engine.

* * * * *